United States Patent [19]

Luedtke et al.

[11] 4,003,057
[45] Jan. 11, 1977

[54] REAR WINDOW DIRECTION FINDING ANTENNA

[75] Inventors: Arthur Luedtke, Marietta; William F. Bentley, Jr., Smyrna, both of, GA

[73] Assignee: The United States of America as represented by the Field Operations Bureau of the Federal Communications Commision, Washington, D.C.

[22] Filed: Sept. 5, 1975

[21] Appl. No.: 610,708

[52] U.S. Cl. .............................. 343/713; 343/853
[51] Int. Cl.² ........................................ H01Q 1/32
[58] Field of Search .............. 343/711, 712, 713; 219/522

[56] References Cited

UNITED STATES PATENTS 3,484,583  12/1969  Shaw .............................. 343/712

*Primary Examiner*—Eli Lieberman
*Attorney, Agent, or Firm*—Wm. Ferrel Bentley

[57] ABSTRACT

A vehicle window mounted in vehicle having a split ground plane carries an antenna having a substantially larger horizontal dimension than vertical dimension. The antenna is arranged so that a plurality of parallel horizontal wire cross connecting elements constitute a major portion of the horizontal dimension in the horizontal plane and two parallel vertical wire spaced whip elements extend in the vertical dimension in the vertical plane. The parallel wire horizontal cross connecting elements function as delay lines and loading for adjusting the impedance of the antenna. The two parallel vertical wire spaced whip elements operate so that the vehicle body functions as a ground plane. The whip antennas in combination with the delay lines produce two directional pickup patterns at its two outputs ports.

8 Claims, 2 Drawing Figures

4,003,057

REAR WINDOW DIRECTION FINDING ANTENNA

CROSS — REFERENCES TO RELATED APPLICATIONS

None.

BACKGROUND OF THE INVENTION

Field of the Invention

This invention relates generally to improvements in a combination vehicle window and antenna, and more particularly pertains to a new and improved antenna wherein the antenna consists of two parallel vertical element wire spaced whip elements with parallel horizontal wire cross connecting elements on a vehicle window. A specific embodiment illustrating the present invention comprises a vehicle window with the antenna carried on the surface of the window glass. The antenna of the illustrative embodiment is preferably flat rectangular copper strips that have been joined together by soldering in such a manner to provide a continuous electrical circuit for sufficient reception or transmission of radio signals in all directions.

Description of the Prior Art

Those concerned with the development of antennae, particularly mobile direction finding antennae have long recognized the need for eliminating conspicuous unsightly antennae mounted and extending from a vehicle body. In the past, mobile direction finding antennae would comprise a Finch Loop or other suitable antennae mounted in the center of the vehicle presenting an unsightly conspicious unaesthetic antennae. Direction finding antennae attached to the outside of the automobile body present mechanical and electrical problems besides attracting visual attention to the vehicle. The use of antennae in automobile windows is found in U.S. Pat. Nos. 3,414,902 and 3,484,584 issued to Hugh E. Shaw, Jr., on issued Dec. 3, 1968 and Dec. 16, 1969 respectively. Both patents disclose antennae that are laminated between two layers of glass of an automobile windshield.

SUMMARY OF THE INVENTION

An object of the present invention is the provision of a rear window defroster antenna suitable for direction finding of unknown radio frequency signal transmission sources. Another object is to provide an antenna that is inconspicious when placed onto or into a vehicle window mounted in a vehicle, having a split ground plane. A further object of the invention is the provision of an antenna with two parallel vertical wire spaced whip elements and a plurality of interconnecting parallel wire horizontal cross connecting elements which function as delay lines and for the purpose of impedance determination. A still further object is that the wire elements constituting the antenna are located symmetrically with respect to the window. An additional object is to connect the lower end portion of the parallel vertical wire spaced whip elements to a directional signal processor receiving system which drives a directional indication device. A further additional object is that the parallel vertical wire spaced whip elements consist of rectangular copper filamentary elements with a width greater than that of the parallel wire horizontal cross connecting members. The parallel horizontal wire cross connecting elements are considerably longer than the spacing of adjacent neighboring elements of the parallel vertical wire spaced whip elements and parallel wire horizontal cross connecting elements. The spacing of the parallel vertical wire spaced whip elements and parallel wire horizontal cross connecting members is considerably greater than the thickness of the copper filamentary element. The copper filamentary elements are essentially invisible to a vehicle occupant or outside observer when the antenna is installed on or in an automobile window such as a rear window. The copper filamentary wire elements occupy an area on the window having a substantially larger horizontal dimension than vertical dimension.

For the purpose of definition, the term "wire" as used in this disclosure includes any electroconductive material applied in the form of a filament such as metallic paint and the like. Wire also can be a copper filamentary element such as that manufactured under the tradename "CIRCUIT-STICK" in Torrance, California. In the instance of antennas applied on monolithic windows, the wire can be applied directly to the glass surface using known methods to produce electroconductive coatings.

BRIEF DESCRIPTION OF THE DRAWING

The invention will be readily understood in light of the description of the illustrative embodiment of the present invention which follows. In the drawings which form part of the disclosure, like reference numerals refer to like elements.

DESCRIPTION OF THE PREFERRED EMBODIMENT

Figure 1:
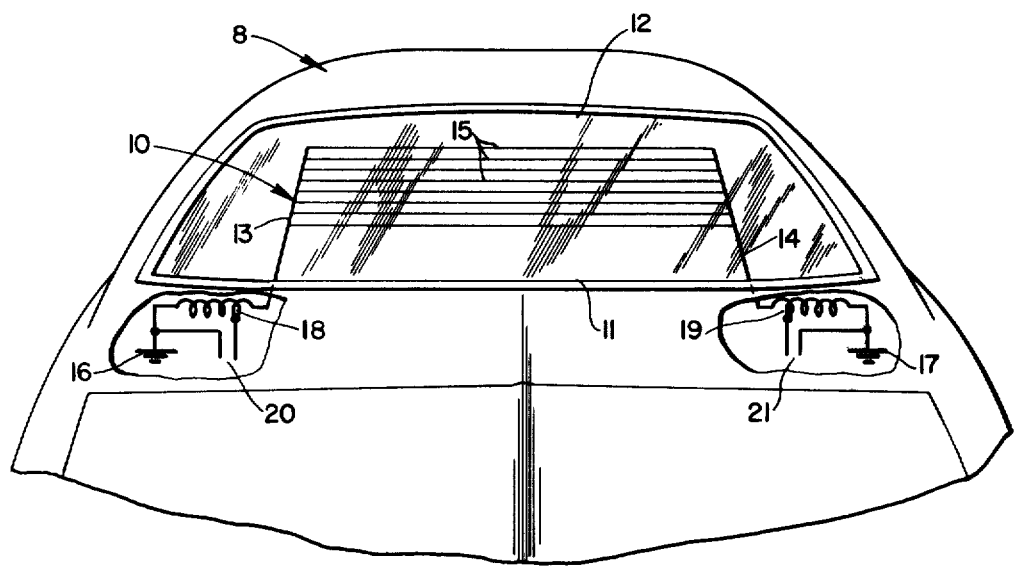
FIG. 1 illustrates a plan view of a preferred embodiment of the invention.

FIG. 1 which illustrates a preferred embodiment of rear window DF antenna 10 shows a vehicle 8 having an automobile window 9 which could be a windshield or rear window. Attached to window 9 is a rear window DF antenna 10 consisting of a left vertical wire spaced whip element 13 and a right vertical wire spaced whip 14 element extending from the base portion of the window 11 to substantially near the top portion of window 12. Between the two vertical wire spaced whip elements 13 and 14 are a plurality of parallel wire horizontal cross connecting elements 15. The actual number of the plurality of parallel wire horizontal connecting members is a function of the desired impedance. Antenna impedance is also a function of the relationship of the horizontal elements to the vehicle split ground plane and is essentially constant over a wide frequency range. Antenna impedance is determined by the relationship of horizontal elements to the vehicle split ground plane and is essentially constant over a wide frequency range. The antenna is equally spaced from the boundaries of the window by a margin of sufficient distance to minimize stray capacitance effects between the antenna and the automobile body in which the window is mounted. Parallel wire horizontal cross connecting elements extend from near the base 11 of the window 10 to substantially near the top of the window 12 in a horizontal plane. The larger the number of parallel wire horizontal cross connecting members 15 that are used is a direct function of the lowering of the antenna impedance. Further, parallel wire horizontal cross connecting elements 15 function as delay lines between the left and right vertical wire spaced whip elements 13 and 14. Points 16 and 17 are ground points to the vehicle body to establish ground plane for the antenna system. Left and right vertical wire spaced whip elements 13 and 14 can either be connected to matching transformers 18 and 19 respectively and then connected to a directional signal process receiving system, or directly to a directional signal processing receiving system.

Ground points 16 and 17 also serve as a common ground point for coaxial cable terminations 20 and 21 and for a transformer return of transformers 18 and 19. Wire elements 13, 14, and 15 (as many as required for a desired nominal impedance) may be of any suitable material falling into the above previous definition of wire. A suitable material is CIRCUIT-STICK manufactured in Torrance, California which is a rectangular copper wire element with an adhesive backing. Any suitable substitute may be used in lieu of CIRCUIT-STICK. The 0.1 inch width parallel vertical wire spaced whip elements 13 and 14, and the 0.03 inch width parallel horizontal wire cross connecting elements 15 are applied onto the window with the existing adhesive backing of CIRCUIT-STICK. The width of CIRCUIT-STICK is not critical for receiving systems, but is for transmission systems. The joints of the parallel vertical wire spaced whip elements and parallel horizontal wire connecting elements can for and by way of example be soldered together so as to have electrical continuity, or be bonded together utilizing printed circuit cement. Another method that could be utilized is welding.

Figure 2:
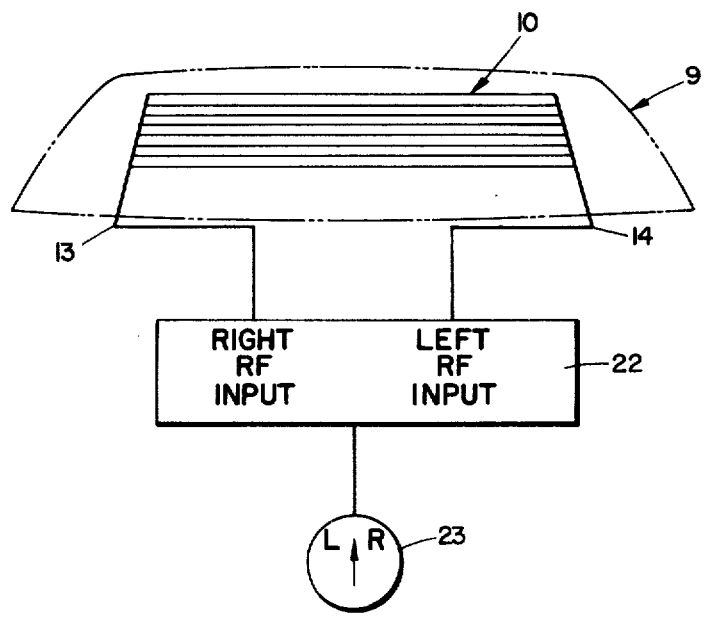
FIG. 2 illustrates an embodiment of the system.

The operation of rear window DF antenna 10 is best described with reference to FIG. 2 where the antenna 10 mounted in or on window 9 has left 13 and right 14 parallel vertical wire spaced whip elements connected to a two port directional signal processor receiving system 22 which drives a directional indicator 23. If the unknown rf signal transmission source is to the right-front, right, or right-rear of vehicle 8, a right sense indication will be received on indicator 23. If the unknown rf signal source is to the left-front, left, or left-rear of vehicle 8, a left sense indication will appear on the indicator 23. If the unknown rf signal source is directly in front or behind vehicle 8, there will be no sense indication on the directional indicator 23. Turning vehicle 8 in either direction will resolve any ambiguity as to whether the source is in the front or the rear of vehicle 8.

Rear window DF antenna 10 is insensitive to occupants in vehicle 8 and to various surroundings. Further, antenna 10 is insensitive to ignition noise from other vehicles. In near fields of electrostatic impulses, antenna 10 yields less response than an open whip. The frequency range of antenna 10 is from approximately one to 50 megahertz for holding a constant uniform pattern. The lower frequency limit is determined by the gain and sensitivity of the direction finding receiving system along with and including the field intensity. The upper frequency limit of antenna 10 is determined and set by the characteristics of the window opening of the vehicle. The window opening 9 absorbs energy going to antenna 10. By utilizing matching transformers 18 and 19, antenna 10 exhibits three decibels of gain plus a pattern improvement over a wider portion of the frequency spectrum. The gain is a function of the enclosed area of parallel vertical wire spaced whip elements 13 and 14. Parallel wire horizontal cross connecting elements 15 do not directly effect the gain; only impedance, the less parallel wire horizontal cross connecting elements 15 utilized in antenna 10, the higher the nominal impedance. Reaching a 50 ohm nominal impedance is impracticable as too many parallel wire horizontal cross connecting elements 15 would be required which would absorb too much power. Matching transformers 18 and 19 are therefore used to match antenna 10 usually having an impedance of 100 to 200 ohms to directional signal processor 22 usually having an input impedance of 50 ohms. Directional signal process or 22 could be a Mobile Directional Comparator, a copending application Ser. No. 611,954 filed Sept. 10, 1975 assigned to the same assignee, used in combination with a communications receiver or any other suitable directional signal processor.

Various modifications are contemplated and may obviously be resorted to by those skilled in the art without departing from the spirit and scope of the invention, as herein defined by the appended claims, as only a preferred embodiment thereof has been disclosed. The antenna may be mounted in a window between two pieces of glass. It may be placed onto the window in an electroconductive form by silk screening or other obvious methods. While the preferred embodiment described herein refers to an antenna mounted on an automobile window, the principles of the invention are adaptable for use of the antenna on any particular surface whether it be a window or any other electromagnetic transparent surface in combination with a split ground plane. A split ground plane can be any vehicle which has a vehicle hood or trunk extension by and for way of example having a symmetrical sedan situation. The rear window DF antenna 10 is affixed to the window 9 of vehicle 8 wherein the window is positioned between the roof 8 and trunk or hood extension. The number of parallel wire horizontal cross connecting elements for and by way of example can be eight on the average for a one hundred ohm impedance but may be any chosen number for any desired impedance.

What is claimed and desired to be secured by Letters Patents of the United States is:

1. A rear window DF antenna mounted on a vehicle window of a vehicle having a split ground plane comprising two paralleled vertical wire spaced whip elements spaced apart and connected to separate outputs; and a plurality of parallel horizontal wire cross connecting element means forming a delay line.

2. The rear window DF antenna of claim 1 wherein said two parallel vertical wire space whip element means function as two vertical antennas.

3. The rear window DF antenna of claim 2 wherein said plurality of parallel horizontal wire cross connecting elements means function as impedance loading.

4. The rear window DF antenna of claim 3 wherein said plurality of parallel horizontal wire cross connecting elements comprises from six to eight elements.

5. The rear window DF antenna of claim 4 wherein said elements occupy a larger horizontal dimension than a vertical dimension.

6. The rear window DF antenna of claim 5 wherein said vertical elements have a width of 0.1 inch and said horizontal elements have a width of 0.3 inch.

7. The rear window DF antenna of claim 5 wherein said antenna is equally spaced from the margins of said vehicle window to equalize stray capacitance.

8. The rear window DF antenna of claim 1 wherein said two vertical element means are connected to a directional signal processor forming a direction finding system.

* * * * *